Oct. 29, 1963
A. R. REDROW
3,108,307
WINDSHIELD CLEANER MECHANISM
Filed Feb. 5, 1962
2 Sheets-Sheet 1
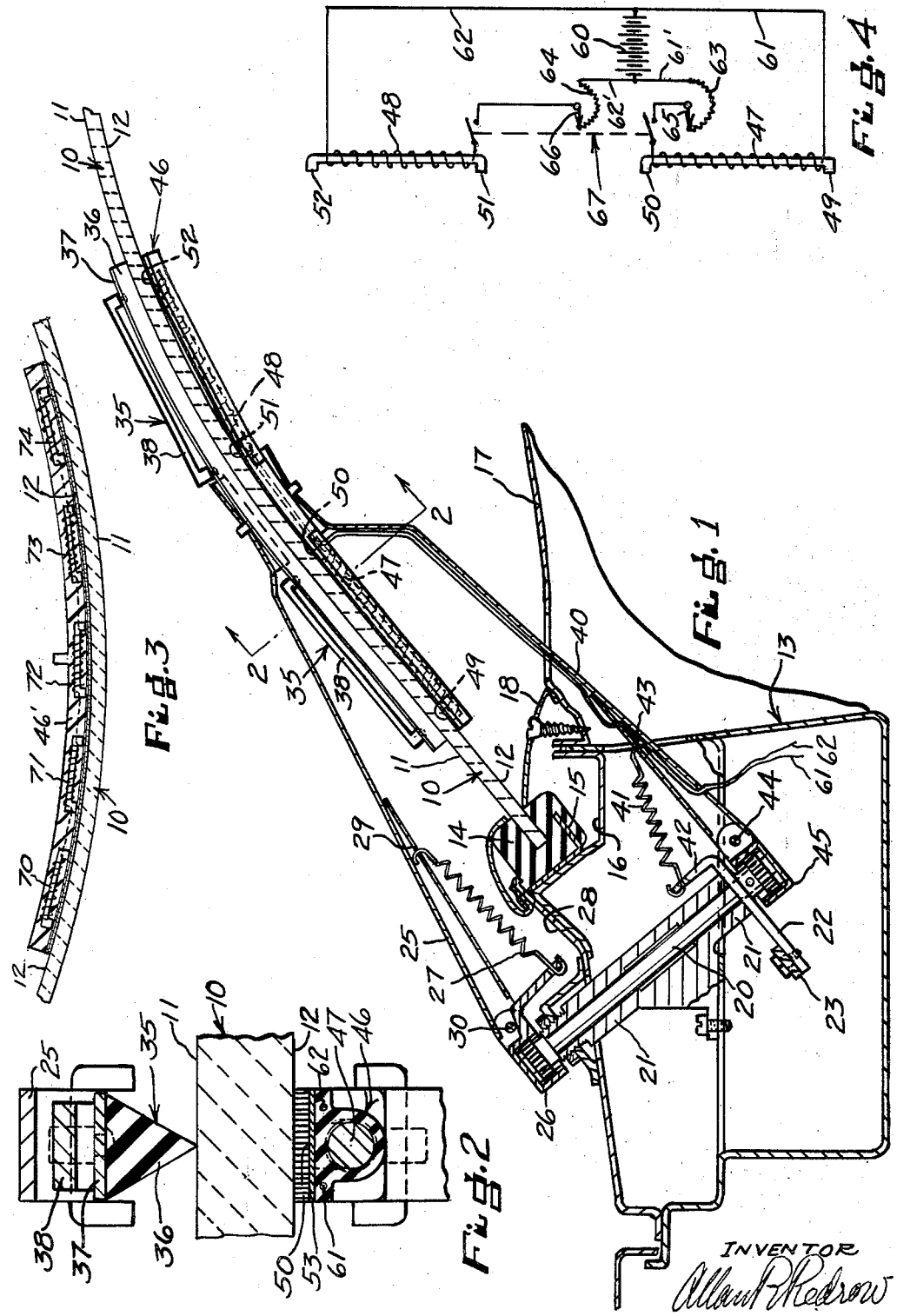
INVENTOR
Allant P Redrow Oct. 29, 1963  A. R. REDROW  3,108,307
WINDSHIELD CLEANER MECHANISM
Filed Feb. 5, 1962  2 Sheets-Sheet 2
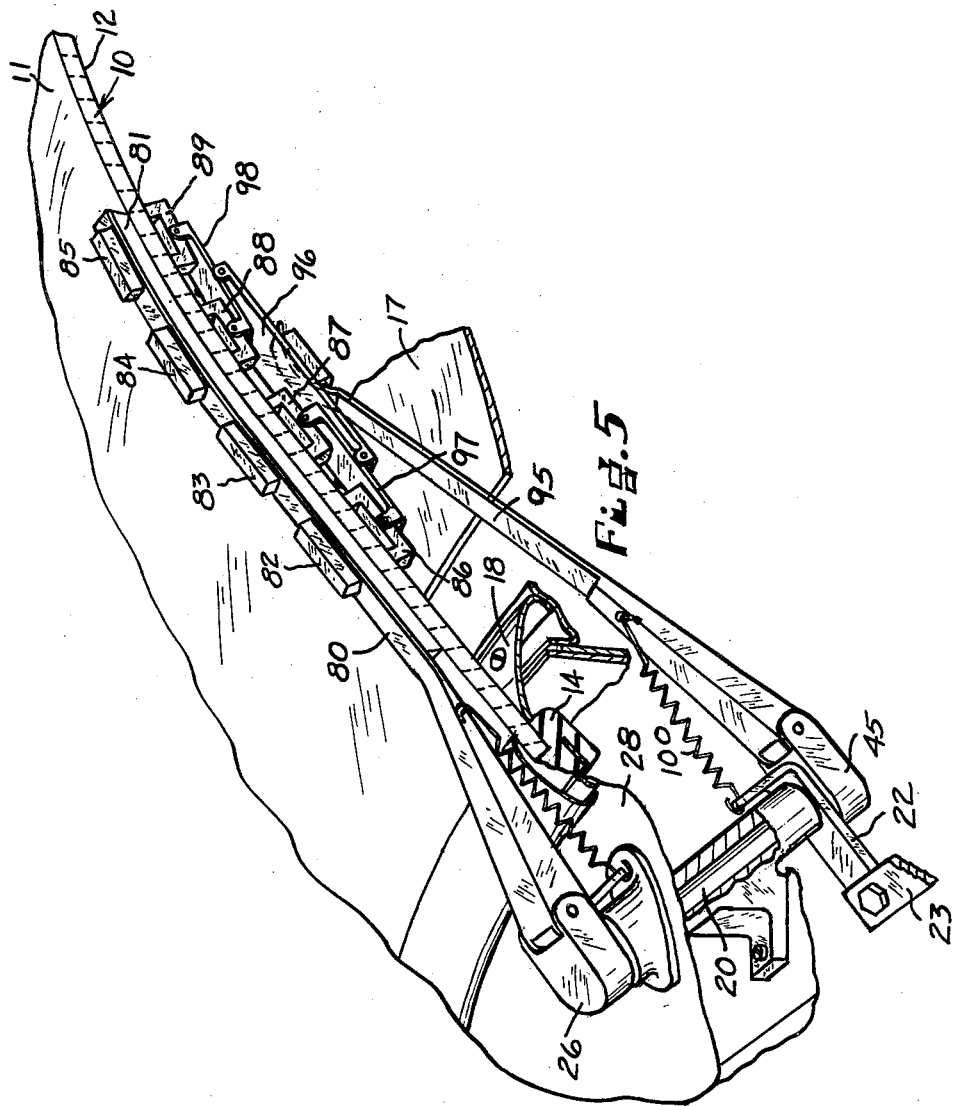
INVENTOR.
Allan R. Redrow United States Patent Office 3,108,307
Patented Oct. 29, 1963

3,108,307
WINDSHIELD CLEANER MECHANISM
Allan R. Redrow, 12 Beechmont St., Worcester 9, Mass.
Filed Feb. 5, 1962, Ser. No. 170,997
8 Claims. (Cl. 15—250.28)

This invention relates to a windshield cleaner mechanism and more particularly to a magnetic means for engaging a wiper blade against the surface of a windshield to be cleaned.

While conventional wiper means perform adequately under normal conditions, with the introduction of more curvature to the windshield glass of modern automobiles and with the increasing speeds at which automotive vehicles may be driven on our through-way road systems, areas of the windshield glass cannot be properly cleaned. The present day wipers using more or less flexible blades which are supported by driving arms that are resiliently urged toward the windshield, have about reached the ultimate limit of resilient pressure which can be tolerated. When the driving arm is urged to hold the rubber wiper blade firmly against the glass at the center of the windshield, the blade is not so firmly pressed toward the glass at the side edges of the windshield where the glass tends to fall away from the front and turn around the side of the body.

Also, as is well known, during the high speed operation of a vehicle, the flow of air currents around the various curved portions of the surface of the windshield causes the wiper blade carried in the conventional manner to lift away from the glass. The lifting action can be so severe as to cause the wiper blade to skip over certain areas of the surface leaving the glass uncleaned at times. This action is very evident on the windshields of certain aircraft where clear vision is especially desired during landing operations.

It is, therefore, an object of this invention to overcome these deficiencies of the prior art wiper means by providing a wiper structure that is more completely effective irrespective of the speed of operation of vehicle or within reason, the degree of curvature of the windshield.

It is another object of this invention to provide a wiper mechanism having means to easily vary the degree of contact pressure established between the wiper blade and the glass to adjust the wiper action to varying conditions of use.

It is another object of this invention to provide a magnet and armature means operating on opposite sides of a windshield to be cleaned to control the engagement of the wiper blade against the exposed surface of the glass.

It is another object of this invention to make use of a magnetic attraction force to hold a wiper blade against the surface of a windshield to be cleaned.

It is another object of this invention to make use of a magnetic field to cause a flexible wiper blade to be conformed to the curved surface of a windshield.

All these and other objects will be understood more fully from the detailed description given below.

In the drawings:

FIG. 1 is a side elevation of a windshield structure with this invention associated therewith;

FIG. 2 is a detailed view taken on line 2—2 of FIG. 1;

FIG. 3 is a modified form of magnet supporting arm for use with more severely curved windshields;

FIG. 4 is a diagrammatic showing of a circuit for energizing the electromagnet means; and FIG. 5 is a perspective view showing a modified wiper blade construction.

Referring to FIG. 1 for one representation of the present invention, the windshield cleaner takes the form of a resilient wiper mechanism adapted to work against a windshield glass 10, the exposed surface 11 of which is to be cleaned. The opposite side 12 of the windshield faces the inside of the vehicle. The glass 10 is supported in the body structure generally designated 13 in a conventional manner as by being carried in a rubber sealing ring 14 supported in a channel 15. The windshield 10 is mounted in relation to the body such that a drain trough 16 is provided as is well known. An instrument panel 17 and trim strip 18 is shown.

A drive shaft 20 for the windshield wiper mechanism is mounted for oscillating motion in the body structure 13 and the shaft 20 is carried in suitable bearing means 21 to be oscillated in a conventional manner by a lever 22 fixed or keyed to the drive shaft 20. A reciprocating link 23 may be driven by a motor to effect oscillation of the drive shaft 20 through its pivotal connection to the end of drive link 22.

A drive arm 25 is disposed on the outside of the windshield 10 for carrying the wiper blade, the drive arm having a hub 26 fixedly keyed to the outer end of the oscillating drive shaft 20 in a known manner. The drive arm 25 is pivotally mounted on the hub 26 and a spring 27 is connected between the anchor means 28 integral with hub 26, and a seat 29 on drive arm 25, the seat 29 being spaced upwardly from pivot 30. The spring 27 urges arm 25 toward the exposed surface 11 of the windshield.

At the outer end of the wiper drive arm 25 and removably connected thereto is a windshield wiper element 35. The wiper element takes the form of a pliable cleaner means such as a rubber element 36 to engage the exposed surface 11 of the windshield. The rubber element 36 is provided with a flexible backing member 37 for connection to the drive arm 25. The flexible member 37 supports roughly C-shaped armature elements 38 formed of magnetic iron, the strip 37 being flexible in a direction along a line perpendicular to the exposed surface 11 but being relatively wide and stiff in the direction of a line disposed parallel with the exposed surface 11. The spring element 37 is adapted to simultaneously perform the function of backing up the rubber element 36 to effect a transmission of the driving action of arm 25 to the cleaner element to move it across the windshield surface to be cleaned and also serve as a support for the armature means 38. The armature elements 38 are each fixed to element 37 on one end and freely engage against the element 37 at their other ends respectively. The armature means 38 are situated opposite cooperating magnet means as will appear more fully below. It is apparent that the spring 27 will normally hold the wiper element lightly against the exposed surface of the windshield so that when the wiper blade is in the parked position, it will bear lightly against the surface of the glass.

At the inner end of the oscillating drive shaft 20 there is disposed a second driver arm 40 which is keyed to the opposite end of the drive shaft 20, the arm 40 being keyed to shaft 20 to be held in alignment with the wiper blade drive arm 25. The center line of the wiper blade drive arm 25 and the center line of the drive arm 40 are disposed in the same plane which also passes through the center line of the drive shaft 20. A spring 41 is connected between an extension 42 integral with drive link 20 and a seat 43 on the drive arm 40 to normally urge the drive arm 40 about a pivot 44 carried on its hub 45 so that the upper end of drive arm 40 is urged toward the inside surface 12 of the windshield.

Supported at the upper end of the drive arm 40 is a generally rigid blade 46 which is shaped to approximately follow the average curvature of the path of movement of the element 46 across the inside surface 12 of the windshield as arm 40 is oscillated. Preferably the element 46 is formed of a non-magnetic plastic material for supporting a plurality of electromagnets, the pole pieces of which are faced toward the inside surface 12 of windshield 10. The element 46 as shown in FIG. 1, is provided with two such electromagnets 47 and 48 having pole pieces 49 and 50, and 51 and 52 respectively, which are spaced closely against the inside surface of the windshield.

Since drive arm 25 and drive arm 40 are keyed to the drive shaft 20 to be held in alignment, it is apparent that the pole pieces 49, 50, 51 and 52 carried by arm 40 may be disposed in alignment with the magnetic armature means 38 carried by the wiper drive means 25. As shown best in FIG. 2, the element 46 may be completed by the addition of a pile fabric surfacing such as 53 disposed between its surface and glass surface 21 so that as the element 46 sweeps back and forth across the windshield surface in juxtaposed relation to the armature and wiper carrying blade 37, frictional contact between the blade 46 and inside surface of the glass will be minimized. It is obvious that many other forms of friction reducing bearing means could be provided.

Referring to FIG. 4 a diagrammatic showing of an electromagnet system is made and the circuit includes a battery 60 having a connection 61 with the coil of magnet 47 and 62 with the coil of magnet 48. The opposite end of the battery is connected through the leads 61' and 62' to the resistance elements 63 and 64 and the adjustable contacts 65 and 66 of rheostat structures so that the amperage supplied to the magnets may be varied to control the degree of magnetic attraction exerted between the electromagnets and the armatures 38. Suitable switch means 67 may be provided to complete the circuit from the rheostats to the coils of the electromagnets. The switch means 67 may be operated to simultaneously energize or deenergize both magnets carried in arm 46. As shown in FIG. 4 the sweeps 65 and 66 of the respective rheostats may be adjusted independently to control the attractive force generated between the magnet 47 and its armature 38 and magnet 48 and its armature 38. It is obvious that if it were found to be desirable, both rheostats could be adjusted simultaneously to vary the degree of magnetic attraction simultaneously and uniformly as between the magnets and armatures 38.

The controls shown in FIG. 4 are desired in order to make possible the adjustment of the pressure between the wiper blade and the surface or exposed area to be cleaned, to accommodate different conditions of operation. In certain instances when the glass surface is relatively dry it may be more desirable to provide a lighter pressure between the blade and glass to avoid undue frictional rubbing between the cleaner element 36 and the glass surface. In this instance the electromagnets would be energized only very lightly to produce a minimum of attractive force to draw the armatures 38 and the spring backing strip 37 toward the glass with magnets 47 and 48. Under conditions at the opposite extreme of operation, when a build-up of sleet or heavier deposits might tend to accumulate on the glass surface, it might be desirable to produce a very heavy magnetic attraction between the magnets 47 and 48 and the armatures 38 to draw the wiper blade very firmly against the glass so that the heavier deposits could be wiped free. The greater attractive force may also be used to hold the blade against lifting away from the glass during high speed operation of the vehicle.

It is suggested that the wiper construction 35 may be provided with actual scraper elements which could be drawn into contact with the glass by deforming the rubber element 36 so that scrapers could be used to break loose thin deposits of ice which might tend to freeze on the surface being cleaned. In this connection also it is apparent that the coils of the magnets could be made to serve as electrical heater means carried on the element 46 to heat the glass from the inside to preclude the freezing of ice on the outer surface of the windshield during operation of this magnetic device.

As stated above, the curvature of element 46 is selected to fit the average range of curvature of the ordinary windshield as the arm 40 carries the electromagnets across the windshield. With this construction the magnetic field generated by the magnets 47 and 48 must be designed to be sufficient to draw the armatures 38 toward the exposed surface to cause the wiper blade 36 to clean the exposed surface. Even though during a portion of the sweep of the element 46, one portion of one or the other of the magnets may be spaced slightly away from the glass surface 12, the magnetic attraction can be made sufficient to draw the armatures 38 against the strip 37 with sufficient pressure to shape the wiper blade closely to the surface to be cleaned.

In another form of the invention as shown in FIG. 3, a series of relatively smaller electromagnets can be mounted in a flexible element 46' which may be bent easily toward and away from the inside glass surface 12 of the windshield, the element 46' being stiff in a direction along a line parallel to the inside surface of the windshield to carry the magnets over the inside of the windshield surface as arm 40 oscillates. The element 46', however, should be made quite flexible in a direction along a line toward and away from the surface 12 so that when a magnetic field is established by energizing the plurality of small magnets 70, 71, 72, 73, and 74, for example, the element 46 is caused to engage closely against the curved surface of the glass. In this instance the magnets 70 through 74 may be energized similarly to the construction shown in FIGS. 1, 2, and 4 to be operated in the same manner. In this instance, a layer of pile fabric disposed between blade 46' and surface 12 would keep this surface wiped clean also because arm 46' engages surface 12 with the same degree of pressure as is produced between blade 36 and the exposed surface against which it bears.

Referring to the construction shown in FIG. 3, it is apparent that an increased number of magnetic poles are provided to distribute the magnetic pull more uniformly along the element 46' such that the individual armatures cooperating therewith are uniformly attracted to the magnet means at spaced points respectively to more evenly distribute the pressure between the wiper 36 and the glass surface.

The operation of the mechanism should now be readily understood and it is apparent that a conventional windshield wiper motor (not shown) may be energized to initiate oscillation of drive shaft 20 through drive link 22. As shaft 20 oscillates the hubs 26 and 45 of the drive arms 25 and 40 are oscillated with the shaft. The arms 25 and 40 are thus oscillated in unison so that the wiper element 35 and the electromagnet carrying element 46 are moved across the oppositely disposed surfaces of the windshield with the wiper 35 and element 46 in juxtaposed position. The magnets carried in arm 46 may be energized to produce the desired magnetic attraction on armatures 38 carried on the backing strip 37 which is flexible in one direction only, such that strip 37 and squeegee element 36 are caused to bend around and closely engage the curved surface of the glass. As the arm 25 oscillates the wiper blade 35 is driven in an arcuate path across the exposed surface of the windshield and the electromagnet carrying element 46 follows a similar arcuate path over the inside surface of the windshield. The driven element 46 aids in moving the wiper across the exposed surface of the glass by attracting armatures 38 and tending to carry the armatures with it while simultaneously causing the strip 37 to bend toward the exposed surface as described above.

The magnetic attractive force may be varied to suit the conditions of operation of the wiper mechanism. At high speeds a larger attractive force may be utilized to firmly hold the wiper 36 against the exposed surface of the windshield irrespective of the flow of air currents over the surface to be cleaned. This eliminates the possibility that the wiper blade will be lifted off of the glass surface during operation of the vehicle at high speeds. Furthermore, the armatures 38 are attracted to the magnet on carrying element 46 at widely spaced points along the length of strip 37 to distribute the forces along the length of the wiper blade. In this manner the rubber element 36 is caused to contact the glass with an evenly distributed pressure along the entire length of the wiper blade 35 throughout its entire arcuate sweep so that efficient cleaning of all areas of the arcuate path of the blade is accomplished.

Another form of the invention is shown in FIG. 5 wherein a generally elongated strip of somewhat flexible material 80 may form both the driving and wiper supporting arm. The arm 80 may be formed of flat steel spring or a resilient resin stock shaped to generally fit the contour of the windshield and cowl structure of the vehicle, as shown. A wiper element 81 may be removably mounted on the freely extending portion of strip 80 to be engaged against the surface 11 of windshield 10. The drive arm 80 is of course designed to be flexible in a line directed toward and away from the surface 11 but is stiff in the direction of a line generally parallel with the surface 11. The arm 80 is fixedly mounted on one end of the drive shaft 20 to be driven in an arc across the glass while the extending free end is flexed to accommodate itself to the varying curvature of the surface thereof as will appear below. If desired the arm 80 may be hingedly supported from a hub keyed to drive shaft 20 and may be urged to engage the glass with a light spring as above described. Cooperating with and preferably mounted on the exposed side of the drive arm 80 are a plurality of magnetic armature elements 82, 83, 84, and 85 which are also adapted to cooperate with magnets 86, 87, 88 and 89 disposed to bear against the inside surface 12 of windshield 10.

These may be permanent magnets carried on a suitable drive arm 95 keyed to the other end of drive shaft 20. A yoke 96 is slidably carried on the arcuate shaped upper or free end of drive arm 95, the opposite ends of yoke 96 are each adapted to engage secondary yokes 97 and 98. The ends of yoke 97 are each adapted to support the magnets 86 and 87 and the ends of yoke 98 drivingly engage magnets 88 and 89. The sliding connection between drive arm 95 and yoke 96 allows the yoke 96 to oscillate to a small degree about the axis of the arc which falls in a line disposed generally parallel with the surface 12 and at right angles to the centerline of arm 95, but holds the yoke 96 fixed against rotation relative to arm 95 about an axis generally perpendicular to surface 12. Similarly, yokes 97 and 98 are pivotally carried on yoke 96 to rotate toward and away from surface 12 but are restrained against rotation relative to yoke 96 in a plane generally parallel to surface 12. Each of the magnets 86, 87, 88, and 89 are similarly pivotally mounted upon their respective ends of yokes 97 and 98. It is obvious that the arm 95 and yokes 96, 97 and 98 must be made of materials or in a manner which will not interfere with the establishment of the desired magnetic attraction between the magnets and their armatures.

With such a flexible mounting of the magnets, sufficient movement may be built into the drive mechanism to carry the magnets in an arcuate path across the glass in such a manner that each of their pole pieces may be adjusted to engage closely against the surface 12 throughout the entire path of movement of the arm 95. Each pole piece of the several magnets is preferably made to bear against the surface 12 initially or in the park position of the wiper mechanism and during subsequent operation of the wiper by the attraction between magnets 86, 87, 88 and 89 and armatures 82, 83, 84 and 85 respectively. It is obvious that magnets 86, 87, 88 and 89 may be electromagnets and in this instance the initial pressure between the magnets and the glass may be produced by spring 100 which holds the magnets in position to become effective when the electric current is turned on to draw armatures 82, 83, 84 and 85 toward surface 11. Since a high degree of magnetic attraction between magnets and their armatures can be created as desired in this instance particularly, it is preferable to provide bearing means or pads on each of the engaging faces of the pole pieces of the magnets to minimize friction and control the contact between the pole pieces of the magnets and surface 12 to provide a rubbing contact which will not scratch the glass surface.

The mechanism described in FIG. 5 may be operated in the identical manner as that described in FIG. 1. The lever arm 22 is adapted to be oscillated by a shaft 23 connected to the motor so that shaft 20 may be oscillated. As shaft 20 oscillates the drive arms 80 and 95 which are keyed to shaft 20 in alignment with each other, carry the wiper 81 and the magnet assembly in an arcuate path over the exposed surface 11 and inside surface 12 of the windshield 10. The magnets 86, 87, 88 and 89 attract armatures 82, 83, 84 and 85 to cause the flexible arm 80 to be flexed to the curvature of surface 11 and as the curvature of the glass changes, the pivotal mounting of each of the magnets and the yoke supports, permits the pole pieces of the magnets to adjust themselves to follow the curvature of the inside surface. The magnets and armatures are carried on their respective drive arms 80 and 95 to be held continuously in alignment and thus the magnets and armatures are required only to produce the desired flexing of drive arm 80 to conform the wiper 81 to the curvature of the glass. It will be apparent, however, that a substantially uniform flexing force is made operative at spaced points along the length of drive arm 80 which carries the squeegee or cleaning element 81 to back it up while positively conforming it to the curvature of the glass 11.

Also as described in connection with the mechanism shown in FIG. 1, the degree of magnetic attraction established between the magnets and their armatures can be varied to accommodate the varying conditions of the exposed surface encountered during operation so that the wiper blade can be maintained in direct contact with the surface to be cleaned throughout all portions of its arc of movement irrespective of the curvature or lifting effect of air current.

It has been determined that four electromagnets disposed as shown in FIG. 5, each having a core piece made of ¼" soft iron square stock, approximately 2" in overall length, can be energized with a coil in the form of several hundred turns of a small diameter wire which carries approximately one ampere of current at 12 volts, will draw armatures of a similar stock such as 82, 83, 84, and 85 situated about ⅜ of an inch away, toward the surface 11 with a sufficient pull to produce an attractive force equal to approximately a quarter of a pound of pull on each armature. By such means approximately 15 or 16 ounces of pressure can be established easily throughout the length of the squeegee element 81 to hold it continuously against the surface. Moreover, particular magnets such as 88 and 89 may be powered with a higher amperage if desired, to cause the carrying arm 80 to be conformed to the curvature of the surface with a greater degree of attraction between the magnets and armatures 84 and 85 to ensure proper conformance of the blade 81 to the surface where more extreme curvature is encountered as at the end of the arm 80 where it wraps around the side of the windshield. When more severe conditions are encountered such as when the flow of air currents over the surface of the glass tends to lift the blade from the surface, all of the magnets 86, 87, 88, and 89 may be energized more fully in a manner to produce a higher degree of attraction to hold the wiper 31 against the surface of the glass with a greater force.

In the form of the invention shown in FIG. 5, the armature elements can be made of relatively short length to cooperate with magnets with closely spaced pole pieces. With such a construction the armature elements can be molded integral with the rubber of the squeegee element 81. The armatures may be embedded in the rubber to space them as closely as possible to the glass surface in order to minimize the gap between the respective pole pieces and their armatures. The armatures may be spaced at equidistant intervals in the rubber and protrude from the backside of the rubber squeegee to be used for attaching the rubber to the wiper drive arm. With a proper selection of the rubber consistency and spacing of the armatures, the necessity of providing a spring backing member for the rubber may be eliminated. In this instance a degree of flexibility in the connection between the drive arm and squeegee will be required and the drive arm need supply only the stiffness in a direction along a line parallel to the surface while the squeegee can be made to conform to the glass curvature along a line perpendicular to the exposed surface.

While the above description covers the preferred construction of this mechanism, it is apparent that many modifications may occur to those skilled in the art. It is suggested that in certain instances permanent magnets may be substituted for the electromagnets described above. The use of an ice scraper construction along with the wiper blade 37 has also been described. The magnets as well as their armature elements may be suitably enclosed in a casing for esthetic purposes if deemed desirable.

It is also obvious that an electrical circuit different from that disclosed in FIG. 4 might be used to vary the flow of electrical energy to the electromagnets. A potentiometer suggests itself for variation of the voltage flowing in the coil circuit of the electromagnet such that the magnetic attractive force could be varied at will as described above. The magnetic attraction between an electromagnet and its armature (all other relationships remaining constant) is proportional to the ampere turns in the coil which surrounds the core of the magnet. Since the turns cannot be so easily varied as can the amperage of the current flow to the magnet coil, the circuit should preferably be designed to produce a variation in amperage.

All of the above as well as many other modifications may occur to those skilled in the art which will fall within the scope of the following claims.

I claim:

1. A windshield wiper mechanism making use of magnetic means to hold a wiper element against the surface to be cleaned comprising a curved windshield having an exposed surface to be cleaned, a magnet means having relatively widely spaced poles adapted to be positioned on one side of the curved surface of the windshield, an armature means for the magnet adapted to be conformed to and positioned on the other side of the curved windshield, one of said means cooperating with a wiper element for engaging it with the curved surface to be cleaned, means to drive said one means over the surface to be cleaned while holding the wiper element against the surface by the magnetic attraction which exists between the magnet means and the armature means, and means for varying the degree of magnetic attraction exerted between the magnet means and armature means to control the degree of pressure produced between the wiper and the surface to be cleaned.

2. A curved windshield wiper mechanism making use of magnetic means to hold the wiper against the curved surface to be cleaned comprising a flexible wiper blade, a windshield having an inside surface and an exposed surface to be cleaned, an elongated magnet means having more than two magnetic poles spaced apart along the length of the magnetic means, said poles being exposed toward the inside surface, said poles being movable relative to each other to follow the curvature of the inside surface, said magnetic means being adapted to be driven across the inside surface of the windshield, a flexible armature means for the magnet means for cooperating with the magnet means and adapted to be driven across the exposed surface of the windshield, said movable magnetic poles acting through the glass to establish spaced and relatively uniform magnetic attractive forces between the armature and the several poles of the magnet means, said flexible armature means cooperating with the flexible blade to hold it against the exposed surface, and means to drive said armature and blade across the surface to be cleaned while holding it against the surface by the magnetic attraction exerted between the magnet means and armature means.

3. The mechanism of claim 2 wherein the magnet means and the armature means are carried on elongated arms respectively that are flexible toward and away from the glass surface, said blade and elongated magnet means being carried in substantial alignment one with another, and said drive means is operative to drive both of said elongated arms simultaneously and in juxtaposed relation in paths on their respective sides of the windshield.

4. The mechanism of claim 3 wherein the poles of the magnet means are spaced apart in a generally straight line along the length of the magnet means which length is generally coextensive with the length of the armature means.

5. A windshield wiper mechanism for a curved windshield having an inside surface and an exposed surface to be cleaned comprising a driven elongated wiping blade for cleaning the exposed curved surface of the windshield and a driven elongated arm adapted to support magnet means in a position to move over the curved inside surface of the windshield, the wiping blade including a pliable cleaning element for engaging the exposed surface of the windshield for cleaning it as the blade moves across the surface thereof, the cleaning element including a supporting blade that is flexible in a line disposed generally perpendicularly with respect to the exposed surface to be cleaned but which is substantially inflexible in a line disposed generally parallel to the exposed surface to be cleaned, armature means carried on said cleaning element, and powered means to drive the wiping blade including said armature means and said cleaning element across the exposed surface, said powered means also being operative to drive the magnet supporting arm over the inside surface of the windshield, said magnet means being carried on its arm in a manner to produce magnetic poles at spaced points along the length thereof, said magnet means being adapted to establish a magnetic field from the inside of the windshield of sufficient strength to attract the armature means through the windshield to draw said armature means toward the exposed surface to be cleaned when said magnet support arm is located opposite it, said armature means cooperating with said supporting blade to flex it in a line disposed generally perpendicularly with respect to the exposed surface to conform the pliable cleaning element to the curved surface, and said powered means being arranged to drive the elongated magnet support arm across the windshield in synchronism with the movement of said driven wiping blade.

6. The mechanism of claim 5 wherein said magnet means takes the form of a plurality of electromagnets and means are provided to vary the degree of the magnetic attraction produced between the magnet means and the armature means.

7. A curved windshield wiper mechanism making use of magnetic means to hold the wiper to the surface to be cleaned comprising a curved windshield having an inside surface and an exposed surface to be cleaned, a magnet means in the form of a plurality of C-shaped electromagnets adapted to be driven across the inside surface of the windshield with the ends of the C-shaped pieces facing the surface, an armature for each one of the C-shaped magnets, each of said armatures being adapted to be driven across the exposed surface of the windshield in a position to bridge the ends of the C-shaped pieces, said armature means carrying a flexible wiper blade to clean the exposed surface over which it moves and means to drive said armature and blade across the surface to be cleaned while conforming it to the curvature of the surface by the magnetic attraction exerted between the magnet means and armature means, wherein said magnets are four in number, a pair of yoke elements, and said magnets being pivotally carried at the ends of each of said yokes, a third yoke, each of the yokes forming said pair being pivotally carried at the ends of said third yoke, and said drive means including an oscillating arm for supporting said third yoke for movement in an arcuate path over the inside surface and an oscillating arm for supporting and driving said armature means across the exposed surface of the windshield in an arcuate path, and the movement of said oscillating arms being coordinated to hold said armature elements in bridging relation to said magnet means at all times during their respective movements.

8. A windshield wiper mechanism for a curved windshield making use of magnetic means to hold a wiper to the glass surface to be cleaned comprising a windshield having an exposed surface to be cleaned, a drive means, a magnet means having relatively widely spaced poles adapted to be driven across the surface of one side of the windshield, mounting means for said magnet means to hold said poles adjacent the glass surface, said magnet means having more than two poles and said poles being movable relative to each other in more than one plane to follow the curvature of the glass, flexible armature means for the magnet that is conformable to the varying curvature of the windshield and is adapted to be driven across the other side of the surface of the windshield in coordinated movement with the magnet means, and at least one of said driven means cooperating with a cleaning means for engagement with the glass surface, and means to interconnect said drive means with said driven means to effect cleaning of said surface.

References Cited in the file of this patent
UNITED STATES PATENTS

| | | |
|---|---|---|
| 2,092,927 | Merwitz | Sept. 14, 1937 |
| 2,782,447 | Anderson | Feb. 26, 1957 |

FOREIGN PATENTS

| | | |
|---|---|---|
| 426,562 | Great Britain | Apr. 3, 1935 |
| 559,923 | Italy | Mar. 27, 1957 |